United States Patent [19]

Chiron et al.

[11] Patent Number: 4,716,626
[45] Date of Patent: Jan. 5, 1988

[54] METHOD FOR PROCESSING A CARCASS OR HALFCARCASS OF MEAT AND DEVICE FOR IMPLEMENTING SUCH A METHOD

[75] Inventors: Gabriel Chiron; Marcel Soullard, both of Cholet; Maurice Fradin, Saint Jean de Monts, all of France

[73] Assignee: Bocaviande Chiron, Cholet, France

[21] Appl. No.: 687,419

[22] PCT Filed: Mar. 29, 1984

[86] PCT No.: PCT/FR84/00084
§ 371 Date: Nov. 30, 1984
§ 102(e) Date: Nov. 30, 1984

[87] PCT Pub. No.: WO84/03816
PCT Pub. Date: Oct. 11, 1984

[30] Foreign Application Priority Data
Mar. 30, 1983 [FR] France .................. 83 05243

[51] Int. Cl.⁴ ........................................... A22C 17/04
[52] U.S. Cl. .................................. 17/46; 17/1 G
[58] Field of Search .................. 17/1 R, 1 G, 52

[56] References Cited

U.S. PATENT DOCUMENTS

| 3,748,146 | 7/1973 | Anderson et al. ........... 17/52 X |
| 4,128,916 | 12/1978 | Fick, Jr. et al. .............. 17/52 |
| 4,385,419 | 5/1983 | Cantrell ...................... 17/1 G X |

FOREIGN PATENT DOCUMENTS 2513080  3/1983  France .................. 17/52

Primary Examiner—Willie G. Abercrombie
Attorney, Agent, or Firm—Fleit, Jacobson, Cohn & Price

[57] ABSTRACT

A moving frame (10) comprises a clamping means (25) and a tensioning bar (33) provided with grippers (35) and mounting on a rotary plate (29). By means of a jack (43), it is possible to vary the distance between the members (11 and 12), and to stretch the half-carcass (1). After the half carcass (1) has been gripped in a vertical position, the moving frame (10) is placed in a horizontal position by the action of the pinion (47) cooperating with the sector gear (46). In this position, the muscles are successively cut off from the carcass and the skeleton remains held in the moving frame (10).

13 Claims, 14 Drawing Figures

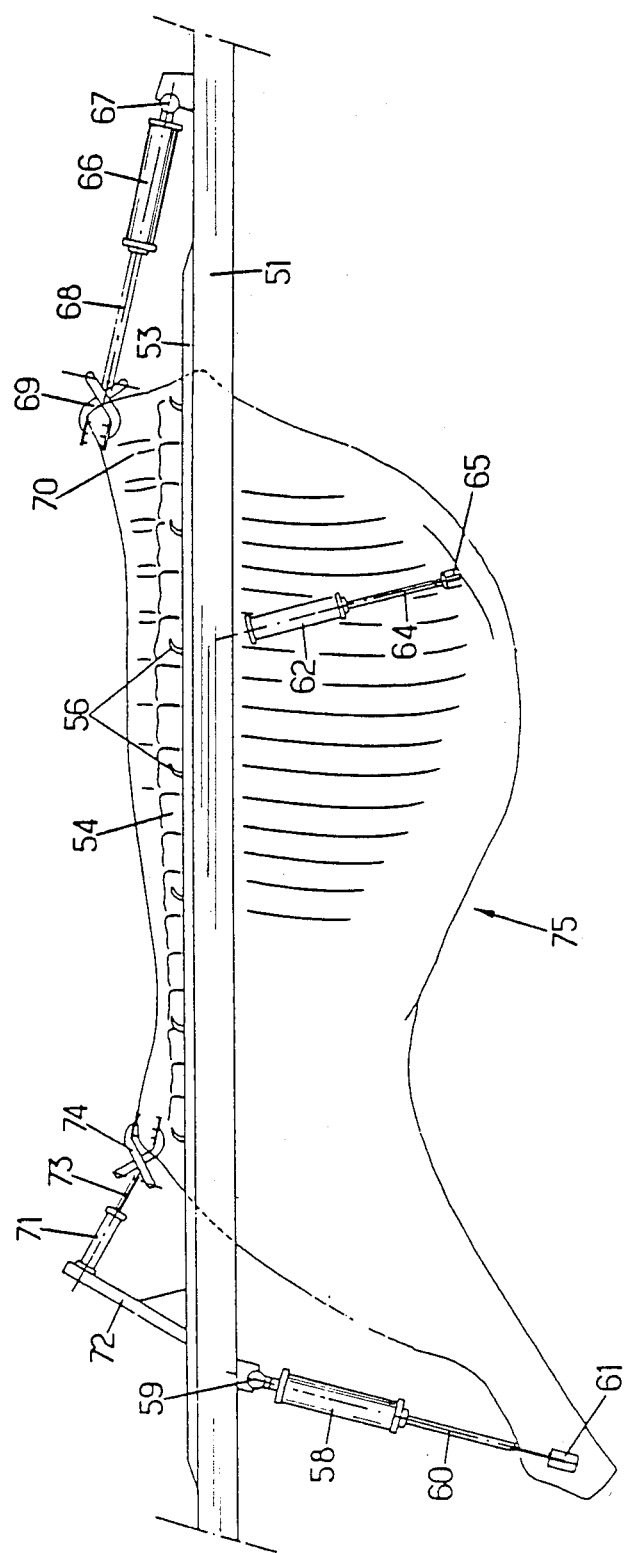

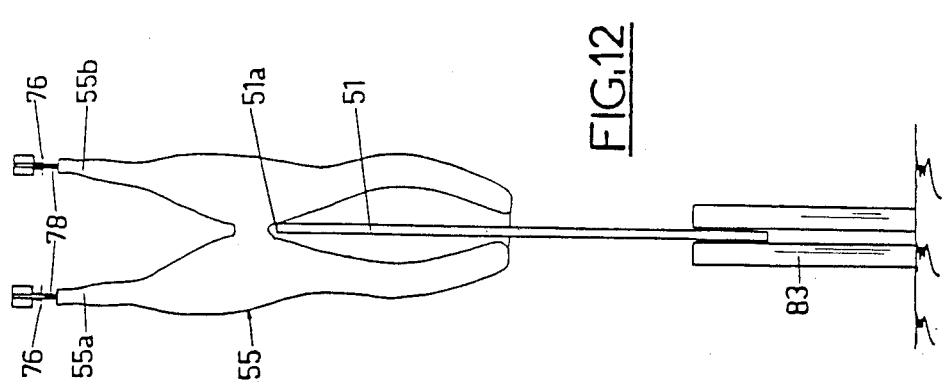
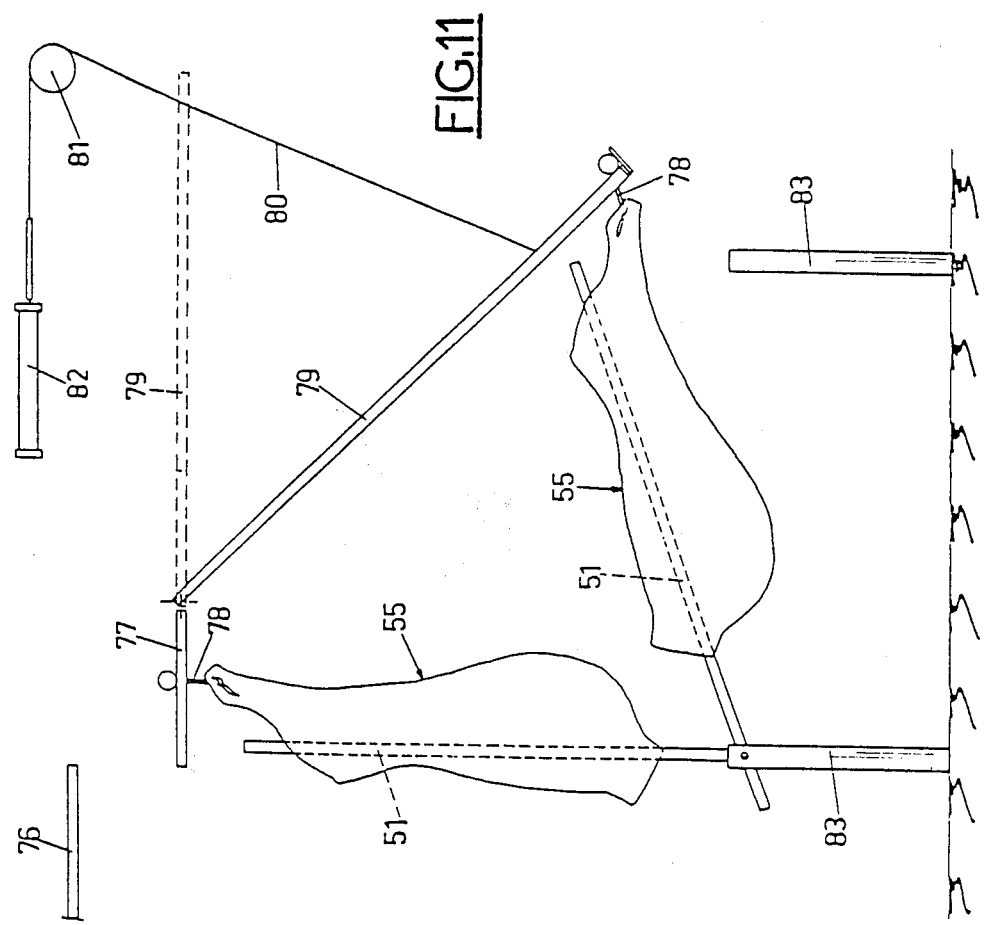

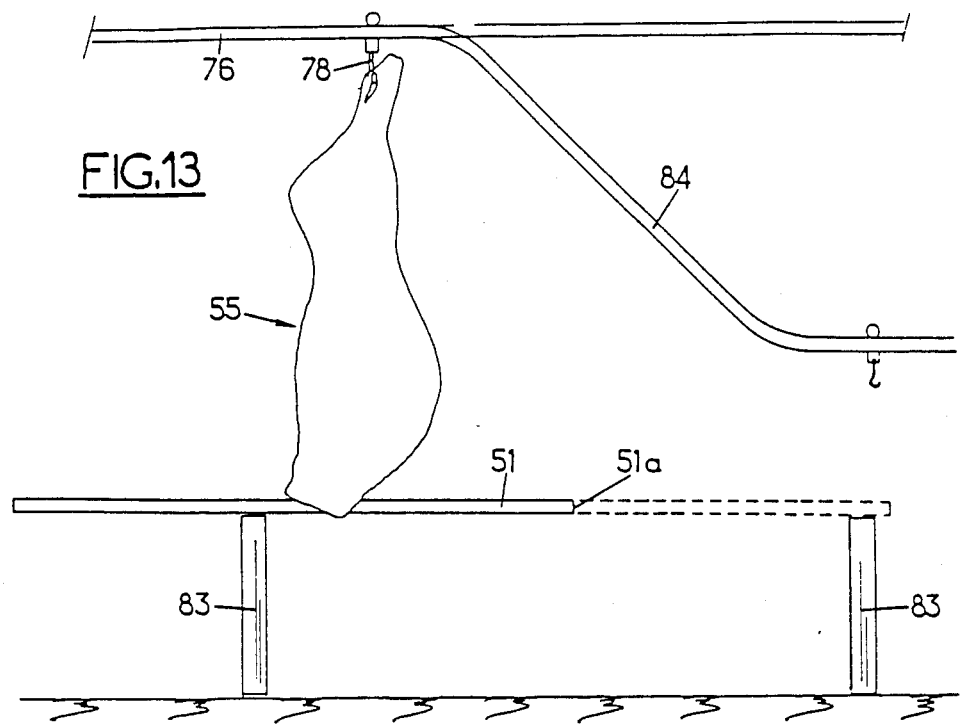
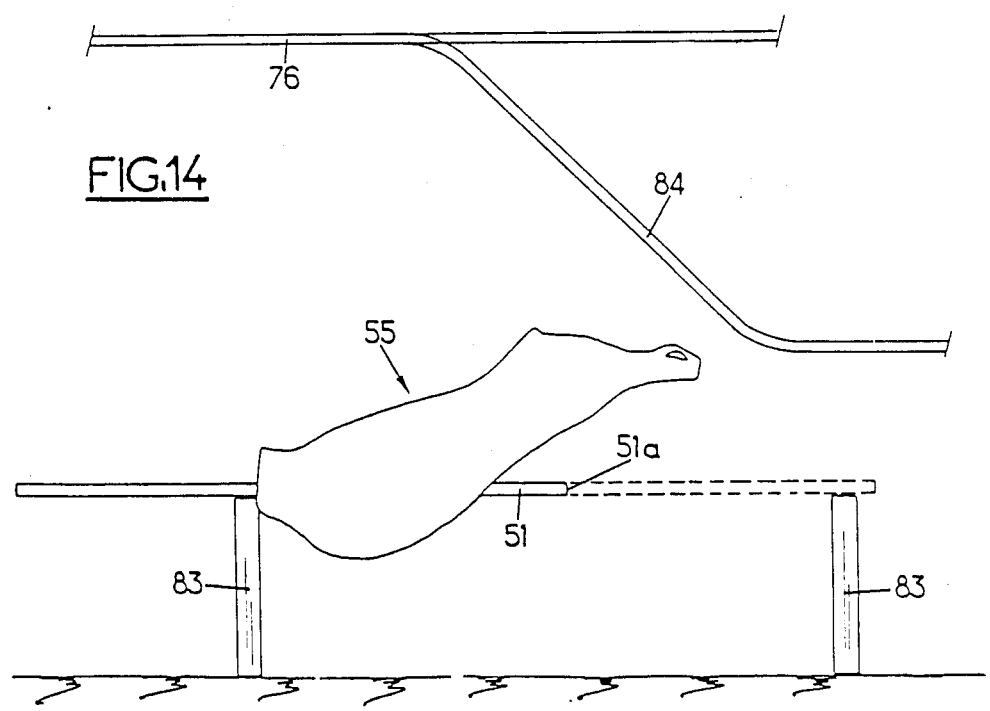

METHOD FOR PROCESSING A CARCASS OR HALFCARCASS OF MEAT AND DEVICE FOR IMPLEMENTING SUCH A METHOD

The present invention relates to a method and a device by means of which it is possible to perform various operations involving the manual removal of meat from a carcass or half-carcass, in particular, of a bovine animal.

After slaughter, the carcasses and half-carcasses of bovine animals are usually placed in cold storage. When the carcasses or half-carcasses are required for distribution, manual deboning is performed, whereby portions of the half-carcass consisting both of bone and attached muscles are cut off in succession. After this first deboning operation, the muscle is cut off with a view to its distribution, before which, if necessary, various additional ooerations, such as storage and packaging, are performed.

An attempt has already been made to improve these artisanal methods by performing a series of deboning operations on a half-carcass immediately after slaughter, the meat still being warm and pliable. Thus, French Pat. No. 2,329,208 describes a method for automatically boning a suspended half-carcass which is then taken up and moved to different stations along an automatic deboning plant. According to this patent, the half-carcass is held in position for certain operations by means of a "hooking-up" process whereby the half-carcass is placed flat and then set-up on a working surface. The half-carcass is then pulled along by a chain, the links of which are able to take hold of the straightened vertebral column, each link gripping a vertebra between the medulary cavity and the external part of the split vertebra. Automatically operated knife blades can then cut up the meat along the bones.

In practice, this method, however, has a certain number of drawbacks. In fact, in most cases, it is extremely difficult to straighten the vertebral column of half-carcasses on account of the vertebral column being insufficiently flexible. Adequate gripping cannot be ensured by gripping the vertebral column, between the medullary cavity and the external zone, and this gives rise to the risk of slipping. Moreover, on account of the entirely automatic nature of the cutting devices, it is not always possible in practice to follow closely the shade of the bone so that some of the muscle risks being left on the carcass.

Therefore, the subject of the present invention is a method of treatment which overcomes these drawbacks and which, in particular, allows the muscles to be cut off from a carcass or half-carcass manually without removal of the bones and practically without any contact with the bones, in a rapid, practical and hygienic manner, not possible hitherto.

The method according to the invention thus adopts a different approach from that advocated in the above-mentioned French Pat. No. 2,329,208, by cutting off the muscles from the carcass without performing the intermediate operation of deboning. The method according to the invention represents a considerable improvement compared to the previously used method for treating a half-carcass, whilst at the same time improving the manual tasks of the personnel involved in operating a semi-automatic plant.

The invention also relates to a supporting device which can be used in a plant where the method according to the invention can be implemented.

In the case of the method, according to the invention, for processing the carcasses or half-carcasses of bovine animals or other quadrupeds, these carcasses are initially processed in a vertically suspended position. In the case of the method according to the invention, the carcass or half-carcass is transferred from its vertical position into a substantially horizontal position, it is kept supported or suspended in this position and the muscles are successively cut off from the carcass or half-carcass without performing a substantial intermediate deboning operation, so that at the end of processing the skeleton of the carcass or half-carcass remains held in its horizontal position. In this manner the muscles are then successively cut off from the bones which remain attached to the vertebral column which itself is kept supported or suspended in a horizontal position.

The method according to the invention, therefore, allows half-carcasses or whole carcasses to be processed and can be applied immediately after slaughter or, depending on the circumstances, after a suitable refrigeration time. Owing to the horizontal position of the carcass or half-carcass, two persons are able to work simultaneously and manually cut off the muscles. Gravity assists the cutting operation and there is no risk, moreover, of the muscles falling on top of each other as would be the case if the cutting operation were carried out on a vertically suspended carcass or half-carcass. In these circumstances, it is possible to perform the cutting work, starting at any point on the carcass, without the risk of the muscles coming into contact with one another and creating unhygienic conditions. It is also possible to cut off the meat simultaneously from both sides of a whole carcass.

The carcass or half-carcass thus held in a substantially horizontal position can be made to rotate about a substantially horizontal axis so that each part can be brought into the best possible position for cutting off the muscles. According to an advantageous embodiment, it is also possible to move the entire carcass or half-carcass upwards or downwards in relation to the operator so that, in this case too, the muscles to be cut off are in the best position.

So that the carcass or half-carcass is firmly fixed in the horizontal oosition during the cutting operation, a stretching force is advantageously applied between at least certain parts of the carcass or half-carcass so as to hold it in position and keep it taut.

To this end, according to a first embodiment, a stretching force is apolied between the end corresponding to the rear knuckle of a half-carcass and several points along the vertebral column which has been split longitudinally, so as to hold the half-carcass in position and keep it taut.

According to a second embodiment, the pelvic girdle of a whole carcass has passing through it a support element which can be placed in a substantially horizontal position and on which the inner face of the vertebral column rests, by the action of gravity, during the entire meat-cutting operation. In the case of a half-carcass, the inner face of the vertebral column of the half-carcass rests on the support element which can be placed in a substantially horizontal position and which preferably has retaining means, the half-carcass thus being held in this position during the entire meat-cutting operation.

In this case, a stretching force is exerted on the rear knuckle or rear knuckles and on at least one area close to the breastbone of the carcass or half-carcass, the latter resting with the inner face of the vertebral column on the support element.

It is also possible to exert a pulling force on other parts of the carcass or half-carcass, for example on the neck so as to straighten it in the horizontal direction if it has not been initially cut off or on the tailbone, in particular in the case of a half-carcass.

The stretching forces thus exerted, the purpose of which is to secure the carcass or half-carcass more firmly on its support element, can be exerted on the carcass in a vertical position before placing it in a horizontal position.

It is also possible to reverse this procedure and first of all transfer the carcass from its initial suspended position into its horizontal position for cutting off the muscles.

According to an advantageous embodiment, the whole carcass, which is suspended vertically by its two rear knuckles on hanging rails, is brought above the horizontal support element, the inner part of the carcass, close to the neck, resting on the said element. The two rear knuckles are then gradually lowered until the carcass is substantially horizontal, the inner face of the vertebral column resting on the said support element. Finally, a movable end part of the support element is slid and made to pass through the cavity of the pelvic girdle or of the chump end. The carcass is thus held on the support element by the action of its own weight, and the muscles can be removed directly. It is also possible to exert the pulling forces mentioned above, so that the carcass is held more securely in this position.

According to another embodiment, the carcass, which is suspended vertically from the hanging rails by its two rear knuckles, is brought above the support element which this time is in a vertical position. The carcass is then displaced vertically relative to the support element so that the latter passes through the cavity of the pelvic girdle or of the chump end. The rear knuckles are then gradually lowered, together with the support element, so that the latter and the carcass are brought into a horizontal position ready for the meat-cutting operations, as described above.

It will be noted that the muscles can be cut off from the whole carcass or half-carcass held in a horizontal position, by manually cutting off, in succession, all of the muscles at one fixed workstation. According to a variation, it is also possible to hold the carcass or half-carcass in a supporting device so that it is able to move in front of several stations, a certain number of muscles being cut off at each of these stations.

The present invention also relates to a device for supporting a carcass or half-carcass so that the muscles can be cut off according to a method of processing according to the invention. In a preferred embodiment, the supporting device according to the invention comprises a support bar which is provided with an upper longitudinal groove designed to receive at least parts of the inner surface of the vertebral column. So that the carcass or half-carcass is held more securely, the support bar can, in addition, advantageously have a plurality of gripping teeth which cooperate with the side faces of the vertebral column.

When it is necessary to exert pulling forces on certain parts of the carcass or half-carcass, pulling jacks are preferably mounted by means of swivel joints at suitable points along the support bar so as to exert the required pulling forces in order to hold the carcass or half-carcass more securely on the support bar.

In another embodiment, the supporting device according to the invention comprises a moving frame provided with two lateral members. A clamping means is mounted on a pivot which is integrally fixed to one of the lateral members and is designed to grip the end part or rear knuckle of a half-carcass. A tensioning bar with a curved profile matching the general shape of the vertebral column of the half-carcass is provided with several grippers which are able to grip, on the outside, the vertebrae of the half-carcass which have been split lengthwise at several points along the vertebral column. One end of the tensioning bar is fixed eccentrically to a rotary plate mounted on the second lateral member of the moving frame. Means are also provided so as to be able to vary the distance between the clamping means and at least some of the grippers mounted on the tensioning bar so as to exert a pulling force on the vertebral column and a tensioning force on the half-carcass.

Therefore, by means of the tensioning bar, the profile of which matches generally the shape of the vertebral column, the half-carcass can be fixed laterally and at the same time stretched so that the half-carcass can be held more securely during the meat-cutting operations. Moreover, as a result of this bar, a considerable axial pulling force can be exerted on the half-carcass without the risk of breaking the vertebral column, particularly at the end of the cutting operation when most of the meat has been removed from the half-carcass.

In a preferred embodiment, the moving frame comprises means which allow it to be rotated through approximately 90° from a vertical position where the half-carcass is gripped to a substantially horizontal position where cutting is performed. Means are also preferably provided so that the height of the moving frame and of the half-carcass supported by it can be varied, as required, in accordance with the cutting operation to be performed at a particular station along the plant.

The moving frame comprises advantageously means consisting, for example, of a sector gear allowing it to be rotated. It can be fixed to a structure which is able to perform a translational movement in front of the various stations of the plant, fixing being performed so as to be able to vary the height of the frame. For this purpose, the frame can be fixed to the structure, for example, by at least one oscillating arm operated by an operating jack.

So that vertebral columns of varying length can be accommodated, the free end of the tensioning bar is preferably telescopic. Moreover, the said free end is advantageously connected, on the rear knuckle side, to the opposite lateral member by means of a rigid brace, so as to reduce the cant of the part of the half-carcass supported by the tensioning bar.

In an embodiment of the plant according to the invention, the moving frame is mounted on a structure suspended from an overhead rail allowing translational movement of the device in front of the various stations of a plant.

According to another embodiment, the moving frame can be mounted on a structure integrally fixed to a trolley which also allows the device to perform a translational movement in front of the various stations of a plant.

The invention will be better understood by examining the detailed description of certain embodiments chosen by way of non-limiting examples and illustrated in the attached drawings in which:

FIG. 10 is a diagrammatic view of a half-carcass suspended in a horizontal position;

FIG. 11 shows a variation of the transfer of the whole carcass or half-carcass into a horizontal position;

FIG. 12 is a side-on view of a stage during transfer of the whole carcass or half-carcass as illustrated in FIG. 11; and FIGS. 13 and 14 illustrate another variation of transfer of the whole carcass or half-carcass into a horizontal position.

Figure 1:
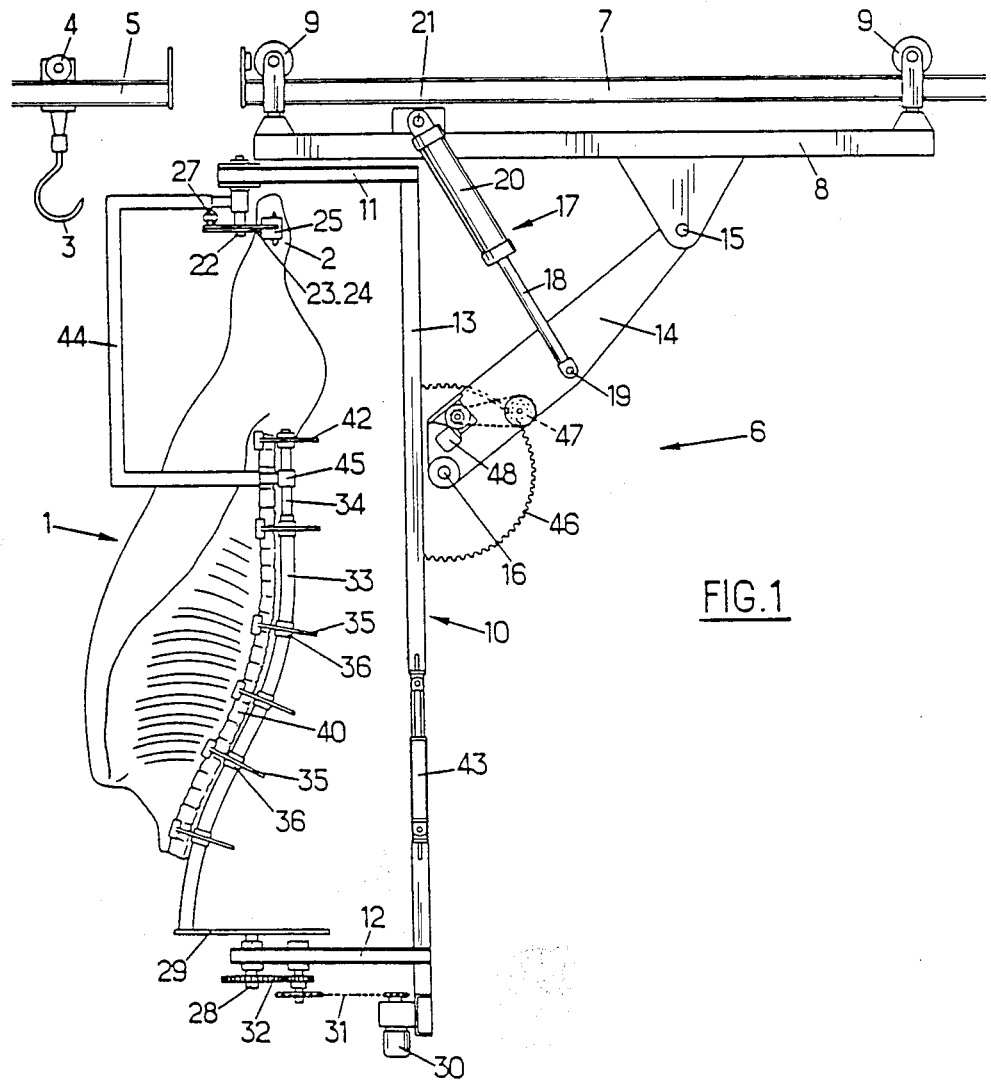
FIG. 1 shows, in diagrammatic form, the first station in a semi-automatic plant for processing a half-carcass according to the invention, in which a half-carcass initially suspended by the rear knuckle is gripped.

As shown in FIGS. 1 to 5, the supporting device according to the invention is designed to support and hold in an extended position the half-carcass of a bovine animal 1 which is conveyed towards the plant whilst being suspended vertically, by its rear knuckle 2, by means of a hook 3 which is able to move along a supply rail 5 by means of a wheel 4. Immediately after slaughter, the animal is skinned and the carcass sawn into two half-carcasses which are suspended, as mentioned above, from different hooks 3 by means of their rear knuckles 2. In this vertical position, the shoulder is first of all removed during a preliminary operation which is not illustrated in the figures.

The plant according to the invention may comprise a plurality of processing stations through which the half-carcasses are able to pass in succession, the supporting device indicated in its entirety by the reference number 6 moving along an overhead guide rail 7. Depending on the configuration of the plant, the rail 7 may be rectilinear or form a loop along which the various workstations are arranged. Of course, the plant may also comprise fixed stations where all of the meat-cutting operations are performed.

The supporting device 6 comprises a structure 8 which is similar to a trolley and which, in the example of embodiment shown in FIGS. 1 to 5, is suspended and is able to move along the overhead rail 7 by means of the wheels 9. A moving frame 10 has two lateral members 11 and 12 and a longitudinal crosspiece 13, which together have substantially the shape of a half rectangle. The moving frame 10 is suspended from the trolley structure 8 by means of an oscillating arm 14 which performs the role of a lever articulated between a pin 15 mounted on the structure 8 and a pin 16 integrally fixed to the moving frame 10. The angle of the arm 14 oscillating about the pin 15 can be varied by means of a hydraulic jack 17. For this purpose, the rod 18 of the jack 17 is connected to a pin 19 fixed to the arm 14 substantially in its middle part. As for the cylinder 20 of the jack 17, it is connected to the pivot 21 mounted on the structure 8.

A pivot 22 is mounted on one of the lateral members 11 which is shown in a high position in FIG. 1, in the vicinity of the end of the said member. This pivot which extends over a short distance towards the inside of the frame 10, parallel to the crosspiece 13, acts as a pivot for the two jaws 23 and 24, the slightly rounded ends 25 of which are provided internally with spikes 26 (see FIG. 3) which grip the rear knuckle 2, as can be seen in particular in FIG. 1. The arms 23 and 24 are tightened by means of a small hydraulic jack 27.

The other lateral member 12 has a pin 28 which is coaxial with the pin 22 of the member 11 and carries, inside the frame 10, a rotary plate 29 which can be driven by the electric motor 30 via a transmission comprising a chain 31 and a gear 32 connecting the pin 28 located on the end of the lateral member 12 and the motor 30 mounted on the crosspiece 13, outside the member 12.

A tensioning bar 33 with a curved profile is fixed, at one of its ends, to the periphery of the rotary plate 29. The free end of the bar 33 is telescopic. In this respect, an end part 34 is able to slide inside the hollow end of the bar 33 and can be fixed in a suitable position by means which are not shown. In this way, the total length of the tensioning bar 33, including the end part 34, can be adapted to the length of the vertebral column of the half-carcasses to be processed.

Figure 4:
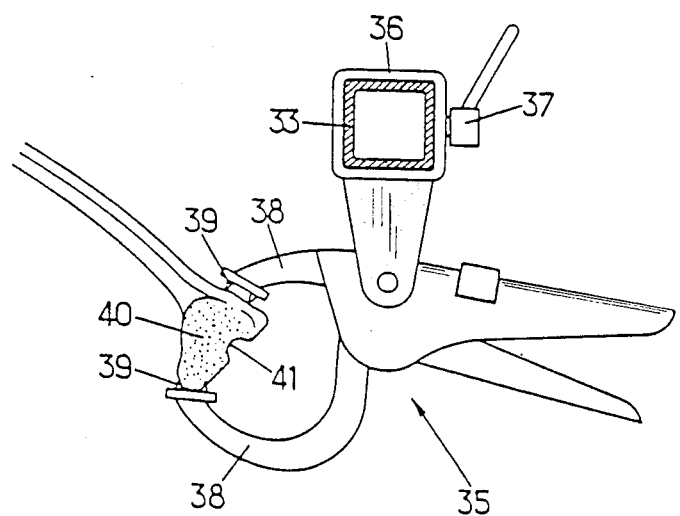
FIG. 4 is a detailed cross-sectional view of one of the grippers gripoing the split vertebras of the half-carcass.

Over its length, the tensioning bar 33 has a plurality of grippers 35 visible in detail in the cross-section shown in FIG. 4. The grippers 35 are mounted on slides 36 which can be held in position on the bar 33 by locking screws 37.

As can be seen in FIG. 4, the gripping ends of the arms 38 of each gripper 35 are provided internally with spikes 39. The arms 38 are shaped so as to be able to grip the split vertebral column 40, the medullary cavity 41 of which can be seen in FIG. 4, and the clamping action takes place on both the external sides of the split vertebral column 40.

In the example shown in the figures, five grippers 35 are arranged on the fixed part of the tensioning bar 33, an additional gripper 42 being mounted on the end part 34. This latter gripper 42, which is identical to the grippers 35, grips the end vertebras or coxal vertebras of the half-carcass.

In view of the generally curved shape of the tensioning bar 33, the latter is able to follow the profile of the vertebral column 40, which is also slightly curved, as can be seen in FIG. 1. The first grippers 35 located along the curved part of the bar 33 in the vicinity of its end fixed to the rotary plate 29 thus grip the cervical vertebras. The succeeding grippers which are located in the vicinity of or directly on the straight part of the bar 33 grip the lumbar vertebras.

In this situation, the vertebral column 40 is held by several gripping devices and is perfectly supported by the tensioning bar 33.

The crosspiece 13 has a telescopic part provided with an operating jack 43 by means of which it is thus possible to vary the total length of the crosspiece 13, i.e. the relative distance between the lateral members 11 and 12. Since the clamp 23, 24 which grips the rear knuckle 2 is integrally fixed to the member 11, while the tensioning bar 33 which grips the vertebral column 40 is integrally fixed to the other lateral member 12 via its end, an increase in the total length of the crosspiece 13, due to the action of the jack 43, causes tensioning of the half-carcass 1.

Moreover, a rigid brace 44 with the shape of a half rectangle is mounted between the end part 34 of the tensioning bar 33 and the pin 22 so as to reduce the cant of the half-carcass 1 held by the bar 33. In the example shown, the brace 44 is arranged in the direction of the middle part of the half-carcass 1. It is mounted via a sliding sleeve 45 on the end part 34.

A sector gear 46 is integrally fixed to the crosspiece 13 on the outside of the latter, i.e. on the opoosite side to the members 11 and 12, this sector gear 46 having the pivot 16 as its axis of rotation. A pinion 47, which is able to rotate about a pin integrally fixed to the oscillating arm 14, can be driven in rotation by the motor 48 also mounted on the arm 14.

Operation of the entire device is, therefore, as follows. A half-carcass, which is suspended by its rear knuckle 2 and is able to move along the supply rail 5, is brought forward in a vertical position. The moving frame 10 is in the vertical position shown in FIG. 1 and the trolley 8 is up against the end of the rail 7. Compared to FIG. 1, the rotary plate 29 has been rotated through 180° and has moved, as a result, the bar 33, the brace 44 and the pin 22 carrying the clamp 23, 24. This clamp is therefore in a suitable position for gripping the rear knuckle. The jack 27 is then operated so as to tighten the clamp 23, 24.

The six grippers 35, 42 are then fixed to the split vertebral column 40 of the half-carcass 1. During this operation, it is possible to move each gripper 35, 42 into a suitable position along the bar 33, 34, according to the shape of the half-carcass to be processed.

After the half-carcass 1 has thus been fixed to the moving frame 1, the conveying hook 3 is withdrawn. The half-carcass 1 is then stretched by operating the jack 43. After this operation, the motor 48 is activated so as to drive the pinion 47 which causes rotation of the sector gear 46 and the moving frame assembly 10 about the pin 16 integrally fixed to the oscillating arm 14. The moving frame 10 is thus located in the horizontal position shown in FIG. 2. Rotation of the plate 29 through 180°, which causes, as mentioned above, rotation of the bar 33, the brace 44 and the pin 22, also causes rotation of the half-carcass 1 about its axis, so as to place it in the position shown in FIGS. 1 and 2.

Figure 2:
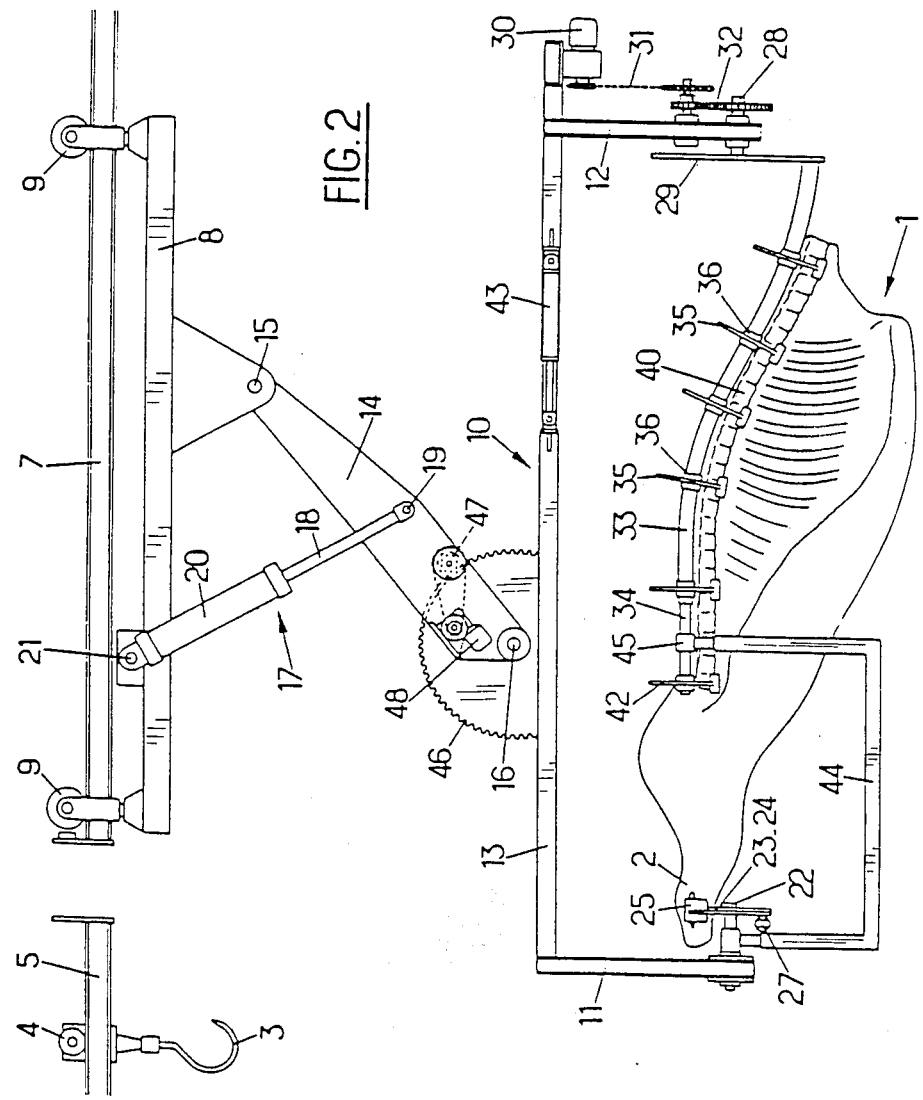
FIG. 2 shows the same station after the movable frame has performed a rotation of 90° so as to place the half-carcass in a substantially horizontal position where the muscles can be cut off.
Figure 3:
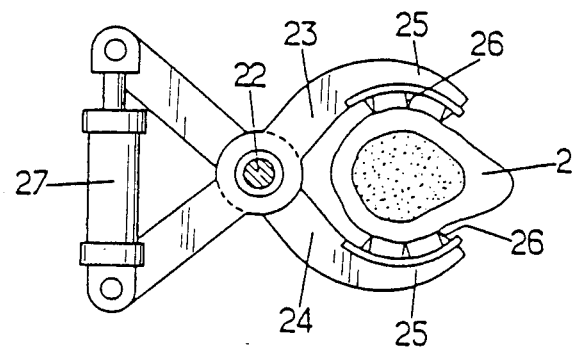
FIG. 3 shows a detailed cross-sectional view of the clamping means gripping the rear knuckle.

In the horizontal position shown in FIG. 2, the half-carcass is ready to be moved, together with its supporting device, along the rail 7 as far as the first station of the plant and then, in succession, in front of each of the stations. At each of these stations, the operator is able to cut off manually and without difficulty the various muscles from the carcass by separating the muscles from the bones held by the supporting device. In order to facilitate his work, at each of the stations along the plant the operator is able to move the carcass 1 so that he/she is able to cut off the muscles from the required area and at the required height. For this purpose, the operator is able to make the carcass perform several movements. First of all, he/she is able to adjust the height of the carcass and of the moving frame assembly 10, in relation to the ground, by means of a combined movement of the pinion 47, which cooperates with the sector gear 46, and of the jack 17, which changes the direction of the oscillating arm 14. Such a combined movement also makes it possible to keep the crosspiece 13 horizontal, or to incline it in either direction relative to the horizontal. Moreover, by activating the motor 30 it is possible to make the half-carcass 1 rotate about the pins 22 and 28 which correspond substantially to the axis of symmetry of the half-carcass. Several operators are also able to work simultaneously at each station.

Figure 5:
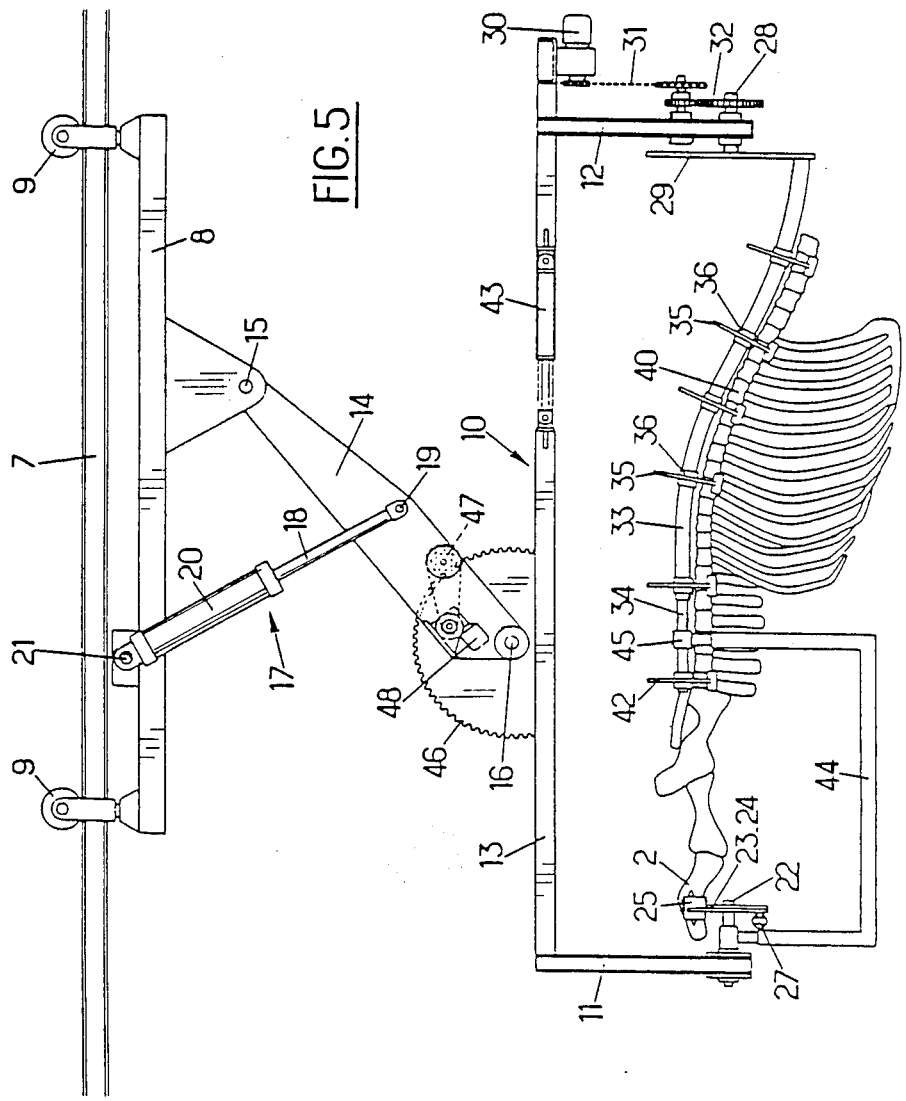
FIG. 5 shows the last stage of the process, when all of the meat has been cut off from the half-carcass and only the skeleton is left.

When all of the muscles have thus been successively cut off, only the skeleton of the half-carcass is left, as can be seen in FIG. 5, held by the various grippers 35, 42 and 23, 24.

It can thus be understood that, with the method according to the invention, the muscles are in each case cut off practically without touching the bones and that this therefore constitutes an operation which is completely different from the conventional operations involving deboning. The muscles are always in a position where they can be easily cut off by the operator. At the last station shown in FIG. 5, therefore, the set of clamping grippers merely needs to be released in order to remove the skeleton which is left. The device is then ready to receive another half-carcass.

Of course, a complete plant consists of a plurality of supporting devices identical to the one described above, and several operators perform several successive operations at various processing stations along the plant.

Figure 6:
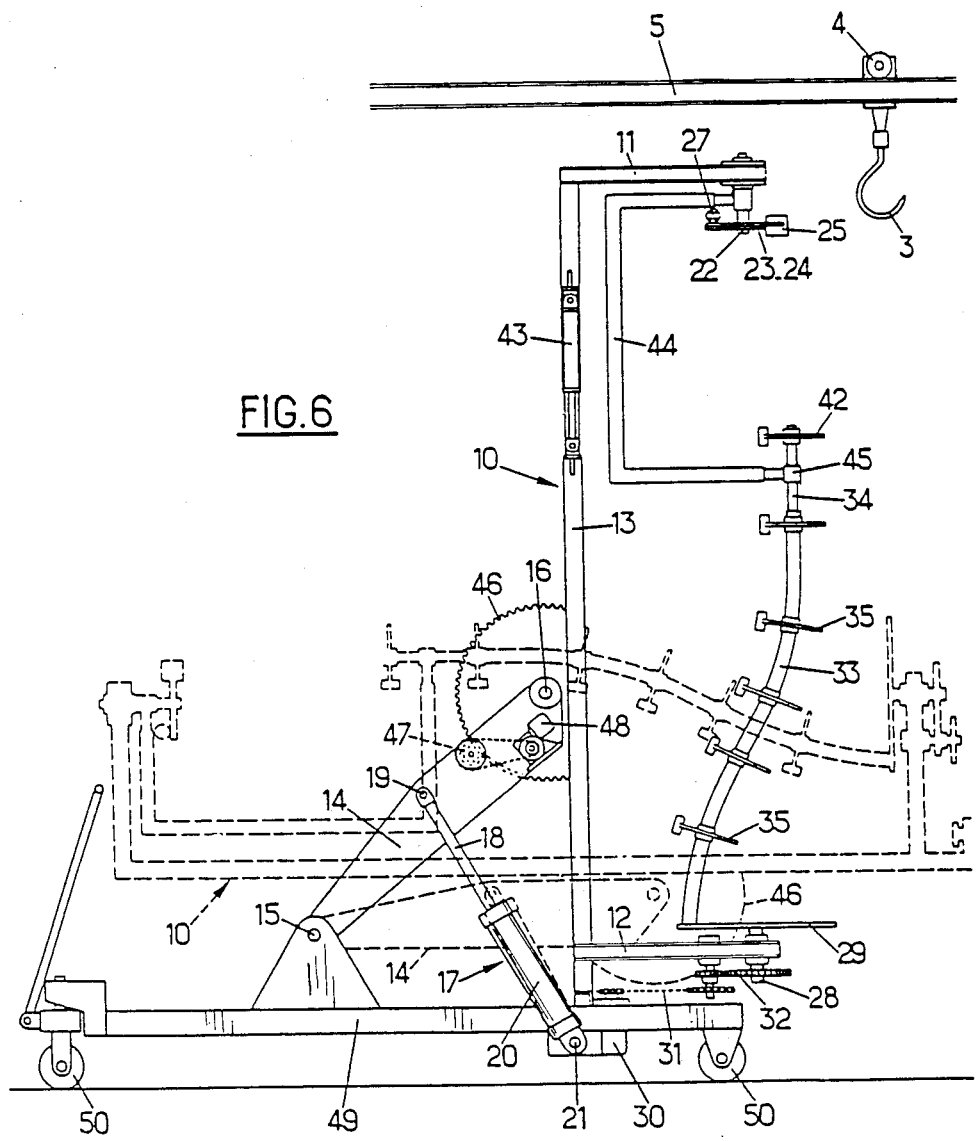
FIG. 6 shows a variation of a supporting device according to the invention, mounted on a trolley.

In the variation shown in FIG. 6, where identical parts have the same reference numbers, the moving frame 10 is mounted on a structure which is in the form of a trolley 49 and which can be moved along the ground by means of castors 50. In the case of this variation, the position of the moving frame 10 together with the vertical crosspiece 13 is shown in FIG. 6 by means of continuous lines. In this position, a half-carcass, which is suspended by its rear knuckle from the hook 3 which is able to move along the supply rail 5, can be gripped, as described above, and then, after tightening of the various grippers 35, 42, 23, 24, stretched by the jack 43. Tilting into the horizontal position shown in broken lines in FIG. 6 is obtained by the action of the pinion 47 which causes rotation of the sector gear 46. Moreover, in the position shown in broken lines in FIG. 6, the oscillating arm 14 has been placed in a substantially horizontal position by operation of the jack 17.

The supporting device assembly can thus be moved along in front of the various stations of a plant, the muscles being successively cut off as described above. In this case, too, the operator at each station is able to rotate the half-carcass or vary its height by operating the various controls provided.

In the two variations, means which have not been shown in the figures can advantageously be provided so as to facilitate the control of various movements by the operator, for example by means of control pedals or levers with easy access.

Figure 7:
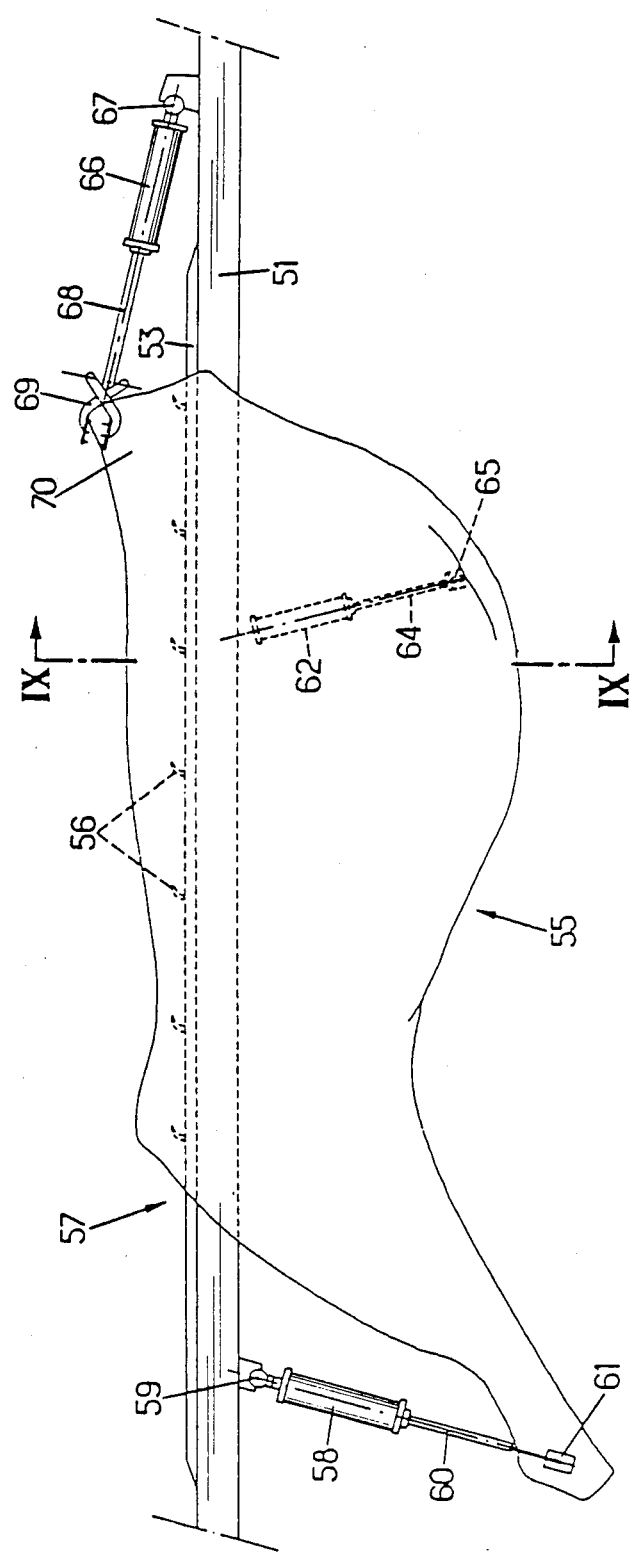
FIG. 7 is a diagrammatic view of a whole carcass suspended in a horizontal position.
Figure 8:
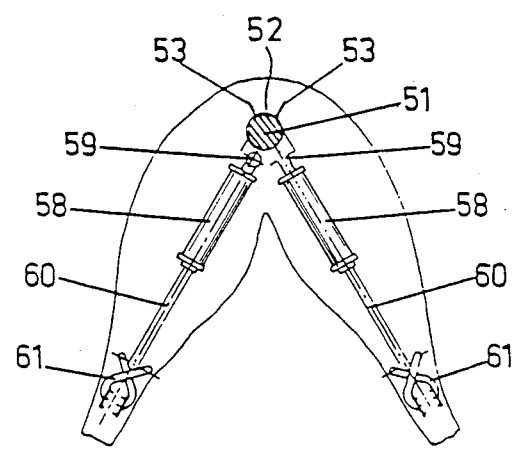
FIG. 8 is a rear view showing the jacks acting on the rear knuckles in the position shown in FIG. 7.
Figure 9:
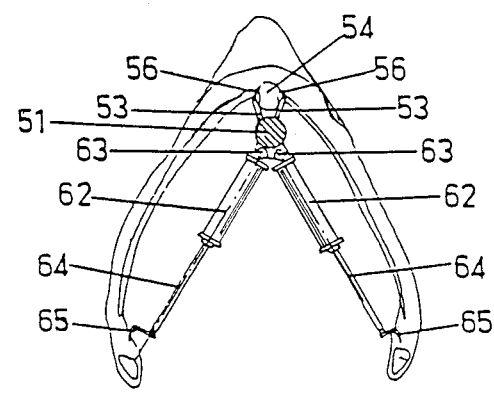
FIG. 9 is a cross-sectional view showing the jacks acting in the vicinity of the breastbone.

FIGS. 7 to 14 show a variation of the supporting device according to the invention. As can be seen in FIGS. 7, 8 and 9, the device comprises essentially a support bar 51 which can be placed in a substantially horizontal position and which has on its upper face a longitudinal groove 52 formed by two inclined fins 53. The degree of inclination of the fins 53 and their position define the shape and the dimensions of the longitudinal groove 52 so that the latter is able to receive at least parts of the inner surface of the vertebral column 54 of the whole carcass 55, as can be seen in particular in the cross-section shown in FIG. 9. Moreover, a plurality of gripping teeth 56, which can be seen in FIGS. 7 and 9, cooperate by gripping the side faces of the vertebral column 54 and thus ensure that the carcass is held more securely on the support bar 51.

The whole carcass 55 is simply placed on the bar 51 held in a horizontal position, the rear end of the said bar 51 passing through the pelvic girdle or the cavity of the chump end into the area marked 57 in FIG. 7.

So that the carcass 55 is held more securely on the support bar 51, the example in FIG. 7 shows a certain number of pulling jacks which allow certain parts of the carcass 55 to be stretched and thus ensure that the latter is held more securely, particularly when the carcass is partially rotated about the axis of the support bar 51 so as to bring certain parts of the said carcass into a favorable position for removal of the muscles. As can be seen in FIGS. 7 to 9, the device, as shown, comprises a pair of rear thrusting jacks 58 which are each articulated, via a swivel jpint 59, with the lower face of the support bar 51. The rods 60 of the jacks 58 have grippers 61 which grip the ends of the rear knuckles of the carcass 55. As can be seen in FIG. 7, the jpint 59 is arranged so that the stretching force due to the two thrusting jacks 58 is exerted from the front towards the rear. Moreover, the two jacks 58 are mounted, as can be seen in FIG. 8, so that the two rear knuckles are kept stretched and at a suitable distance from each other.

Two front thrusting jacks 62 are articulated by means of a swivel jpint 63 in the same manner as the jacks 58, underneath the support bar 51. Their rods 64 have claws 65 which cling to the ends of the flanks in the vicinity of the breastbone area. The arrangement of the two jacks 62 is such that, as can be seen in FIG. 9, a thrusting force is exerted on the two sides of the carcass so as to open the latter. Moreover, the force is exerted, as can be seen in FIG. 7, in a slightly inclined direction from the back towards the front.

In the embodiment shown, the device also comprises a pulling jack 66 articulated with a swivel jpint 67 mounted on the upper face of the support bar 51. The rod 68 of this jack has, at its end, a gripper 69 which fixes itself to the neck 70 of the carcass 65 so as to straighten the latter in the direction of the horizontal bar 51. In the case where the neck has already been cut off, the jack 66 can, of course, be eliminated.

In the variation shown in FIG. 10 in which identical elements have the same reference numbers as in FIG. 7, a similar supporting device is used for the processing of a half-carcass 75. In this case, as before, the vertebral column 54, which is longitudinally split here, partly lodges itself in the longitudinal groove formed by the fins 53. The half-carcass is held in position by the claws 56. Moreover, in this case, it is possible to provide advantageously an additional pulling jack 71 mounted on a support 72 integral with the upper face of the support bar 51 in the vicinity of its rear end. The rod 73 of the jack 71 is provided, at its end, with a gripper 74 which grips the tailbone so that the half-carcass 75 is held more securely on the horizontal support bar 51. Of course, in this case, the stretching means consist of single thrusting jacks 58 and 62 which replace the pairs of jacks used in the case of the whole carcass 55, as illustrated in FIGS. 7 to 9.

FIGS. 11 to 14 show two examples of the transfer of a carcass from the vertical position into the horizontal position with a view to processing by means of a supporting device as shown in FIGS. 7 to 9.

As shown in FIGS. 11 and 12, the carcass 55 is suspended, by its two rear knuckles 55a, 55b, from hooks 78 on hanging rails 76, as can be seen in particular in FIG. 12. The carcass 55 is moved along the rails 76 until it comes into position above the support bar 51 which has been pivoted so as to be vertical as shown in FIG. 11. During its movement, the carcass 55 encloses the bar 51 in the vertical position, the latter entering the carcass through the ribcage. The upper end 51a of the support bar 51 is initially in a sufficiently low position, in relation to the carcass 55 suspended from the rails 76, for this end 51a to be able to penetrate also inside the carcass 55. A section 77 of the hanging rails 76, therefore, is lowered by means of vertical translation. This downwards lowering movement, which the carcass 55 also performs, causes the vertical support bar 51 to penetrate with its upper end 51a into the cavity of the chump end, i.e. through the pelvic girdle of the carcass 55.

Once this operation has been performed, the hooks 78 are made to descend on articulated sections 79 of the hanging rails, this movement being guided gradually by means of a traction cable 80 passing over a pulley 81 and held by a jack 82 with a gradual action. This pivoting movement causes simultaneous pivoting of the support bar 51 which finally assumes a horizontal position on its supports 83, the carcass 55 being supported as shown in FIG. 7.

In the embodiment shown in FIGS. 13 and 14, the carcass 55, which is held as above by its two rear knuckles in a suspended position by means of hanging rails 76 and hooks 78, is brought above the support bar 51 which remains horizontal, but which is moved to the left, for example by means of a telescopic part or a mobile end part, as shown in FIG. 13. The front end of the vertebral column of the carcass 55 already resting on the bar 51, the hooks 78 are gradually moved downwards by means of an inclined section 84 of the hanging rails 76, until the carcass reaches a substantially horizontal position where the end 51a of the support bar 51 is located on the left of the chump end cavity, with reference to FIGS. 13 and 14. The horizontal bar 51 is then made to slide from left to right so that the end 51a passes through the said cavity and, upon emerging, is able to rest on the supports 83, as shown in FIG. 14.

We claim:

1. A method for processing carcasses or half-carcasses of bovine animal or other quadrupeds, comprising the steps of:

vertically suspending the carcass or half-carcass;

transferring the carcass or half-carcass from its vertical suspended position into a substantially horizontal suspended position;

exerting a stretching force on the carcass or half-carcass so as to hold it in position and keep it taut;

manitaining said carcass or half-carcass in said horizontal suspended position while maintaining said stretching force and supporting the carcass or half-carcass by its skeleton;

manually separating the muscles and meat from the bones without performing a substantial intermediate deboning operation while said carcass or half-carcass is maintained in said horizontal suspended position; and continuing said manual separtion until at the end of processing the substantially entire skeleton of the carcass or half-carcass has been separated from the entire meat and muscles, said skeleton remaining held in said horizontal suspended position.

2. Method as claimed in claim 1, wherein the pelvic girdle of the carcass is penetrated by a suppport element which can be placed in a substantially horizontal position and on which the inner face of the vertebral column rests, owing to the effect of gravity, during the entire meat-cutting operation.

3. Method as claimed in claim 1, wherein a pullling force is exerted on the rear knuckle and on at least one area close to the breastbone of the half-carcass, the latter resting with the inner face of the vertebral column on the support element.

4. Method as claimed in claim 3, wherein a pulling force is exert on the neck so as to straighten it in the direction of the horizontal.

5. Method as claimed in claim 1, wherein the carcass, which is suspended vertically by its two rear knuckles from hanging rails, is brought above the horizontal support element, the adjacent inner part of the neck resting on the said element, wherein the two rear knuckles are gradually lowered until the carcass is substantially horizontal, the inner face of the vertebral column resting on the said element, and wherein a mobile end part of the support element is slid and made to pass through the cavity of the pelvic girdle.

6. Method as claimed in claim 1, wherein the carcass, which is suspended vertically by its two rear knuckles from hanging rails, is brought above the support element in a vertical position, the carcass is displaced vertically relative to the support element so that the latter passes through the cavity of the pelvic girdle, and wherein the rear knuckles together with the support element are gradually lowered so that the latter is placed in a horizontal position.

7. A method for processing half-carcasses of bovine animal or other quadrupeds, said half-carcasses being longitudinally split along the vertebral column, comprising the steps of:

vertically suspending the half-carcass by its end corresponding to the rear knuckle;

transferring the half-carcass from its vertical suspended position into a substantially horizontal suspended position by several attachment ppints along the longitudinally split vertebral column;

exerting a pulling force on the half-carcass between its end corresponding to the rear knuckle and said several attachment ppints so as to hold the half-carcass in position and keep it taut;

manually separating the muscles and meat from the bones without performing a substantial intermediate deboning operation while said half-carcass is maintained in said horizontal suspended and taut position; and continuing said manual operation until at the end of the processing all the bones are left attached to the tensioned vertebral column.

8. Method as claimed in claim 7, wherein the pulling forces are exerted on the half-carcass in the vertical position before transferring it into the horizontal position.

9. Method as claimed in claim 7, wherein the inner face of the vertebral column of the half-carcass is placed so as to rest on a support element which can be placed in a substantially horizontal position and which comprises retaining means, the half-carcass being held in this position during the entire meat-cutting operation.

10. Method as claimed in claim 7, wherein a pulling force is exerted on the tailbone of the half-carcass.

11. Method as claimed in claim 7, wherein the shoulder of the half-carcass and /or the neck are initially cut off.

12. Method as claimed in claim 7, wherein the muscles are cut off from the half-carcass in a horizontal position at a fixed work-station by manually cutting off, in sucession, all of the muscles.

13. Method as claimed in claim 7, wherein the half-carcass is held by supporting device which can be moved in front of several stations in a meat-cutting plant.

* * * * *